(12) United States Patent
Carpenter et al.

(10) Patent No.: US 8,494,178 B1
(45) Date of Patent: Jul. 23, 2013

(54) AVOIDING AUDIO FEEDBACK (75) Inventors: Loren Carpenter, Nicasio, CA (US);
Lanny Smoot, Thousand Oaks, CA
(US); Alex Stahl, Emeryville, CA (US)

(73) Assignee: Pixar, Emeryville, CA (US)

( * ) Notice: Subject to any disclaimer, the term of this patent is extended or adjusted under 35 U.S.C. 154(b) by 297 days.

(21) Appl. No.: 12/860,027

(22) Filed: Aug. 20, 2010

(51) Int. Cl.
*H04B 15/00* (2006.01)

(52) U.S. Cl.
USPC .......... 381/93; 361/1; 361/2; 361/82; 361/83; 361/98; 361/95; 361/96; 361/99; 361/100; 361/103; 379/406.1; 379/406.05; 379/406.08; 379/406.12; 379/406.13

(58) Field of Classification Search
USPC ............... 381/1, 2, 77, 82, 83, 303, 28, 98, 381/95, 96, 99, 100, 101, 103, 108, 121, 381/93; 379/406.1, 406.5, 406.8, 406.12–406.14
See application file for complete search history.

(56) References Cited

U.S. PATENT DOCUMENTS

| | | | |
|---|---|---|---|
| 4,008,376 A | | 2/1977 | Flanagan et al. |
| 4,088,835 A | * | 5/1978 | Thurmond et al. ............. 381/83 |
| 4,890,314 A | | 12/1989 | Judd et al. |
| 5,271,057 A | | 12/1993 | Addeo et al. |
| 5,434,912 A | * | 7/1995 | Boyer et al. ............. 379/202.01 |
| 5,717,772 A | | 2/1998 | Lane et al. |
| 6,125,187 A | * | 9/2000 | Hanajima et al. ............... 381/83 |
| 6,608,898 B1 | * | 8/2003 | Moore et al. ............. 379/406.14 |
| 2002/0000875 A1 | * | 1/2002 | Allen et al. .................... 327/557 |
| 2006/0056644 A1 | * | 3/2006 | Kreifeldt et al. ................ 381/96 |

(Continued)

FOREIGN PATENT DOCUMENTS

JP 62278898 A * 12/1987

OTHER PUBLICATIONS

Cheveigne et al, Speech Separation for Speech recognition, May 1994.*

(Continued)

*Primary Examiner* — Davetta W Goins
*Assistant Examiner* — Kuassi Ganmavo
(74) *Attorney, Agent, or Firm* — Kilpatrick Townsend & Stockton LLP (57) ABSTRACT

Methods and techniques to implement a digital signal processor for avoidance of audio feedback are disclosed, in particular, audio signal processing systems that reduce the requirement for physical segregation of sound acquisition and diffusion zones. In a more general aspect, the components and techniques described herein provide a for a sound space and sound processing equipment such that sound travelling electronically in a loop through the sound processing equipment that is output into a physical sound diffusion zone, received at the input to the sound processing equipment, and then re-amplified, etc. is attenuated over that loop by frequency modification. The frequency modification is such that, at least for some signals, on each pass through the loop, the sound processing equipment will attenuate or amplify individual sub-bands of the frequency spectrum of the audio signal that is received at the input of the sound processing equipment. The frequency range of each individual sub-band is modified as it passes through the sound processing equipment, transformed into sound in the physical space, picked up again by the sound processing equipment, and then passes through again, so that the sub-band is attenuated on at least one of those passes through the sound processing equipment. The attenuation can be performed by configuring the sound processing equipment to amplify some input frequencies and shift those frequencies to other frequencies that the sound processing equipment is configured to attenuate.

16 Claims, 8 Drawing Sheets

U.S. PATENT DOCUMENTS

2006/0093173 A1    5/2006   Hamacher et al.
2006/0115094 A1*   6/2006   Abe .................................. 381/66
2007/0104335 A1*   5/2007   Shi et al. .......................... 381/93
2007/0121928 A1*   5/2007   Beaucoup ................ 379/406.08

OTHER PUBLICATIONS

Malvar; "Fast Algorithm for the Modulated Complex Lapped Transform: Technical Report," MSR-TR-2005-2; Microsoft Research TR-2005-2; Jan. 2005; 14 pages; Microsoft Corporation; Redmond, WA; downloaded from URL=http://research.microsoft.com/pubs/70128/tr-2005-02.pdf on Jun. 18, 2010.

Zhu, et al.; "Real-Time Signal Estimation From Modified Short-Time Fourier Transform Magnitude Spectra," IEEE Transactions on Audio, Speech, and Language Processing; Jul. 2007; pp. 1645-1653; vol. 15; No. 5.

* cited by examiner

AVOIDING AUDIO FEEDBACK

BACKGROUND

This application relates generally to audio amplification systems and more specifically to methods and apparatus for avoiding or reducing feedback in audio amplification systems.

A typical audio amplification system, such as a public address system, acquires a desired audio input in the form of sound from one region of space (a stage, for example), then amplifies and projects it into another region (the auditorium, for example) in the form of audio output amplified sound. When a portion of the amplified audio output combines with the desired audio input at the input to the audio amplification system, a feedback loop is created. When the loop gain exceeds unity, i.e., the amplified sound received at the input is diminished from the output less than the amplification, objectionable ringing and oscillation ("howling") can occur where the loudness of the sound output is only limited by the linearity and capacity of the audio amplification system. There have been a number of attempts to design audio amplification systems and sound spaces to deal with this runaway amplification, but they have limits and impose constraints.

One typical trigger that can create a positive feedback loop is acoustical region coupling. For this reason, traditional feedback avoidance strategy includes acoustical separation, directional transducers, and in-line system layout. In addition, appropriate use of absorptive and diffusive materials can minimize acoustical feedback paths. In practice, however, architectural-acoustic recommendations are often outweighed by many valid aesthetic, structural, operational, and economic preferences for large parallel expanses of sound reflectors.

Acoustical separation may not be an option, however, when staging that "breaks the fourth wall" is desirable. When microphones need to be made available in an audience area to enable individual audience or cast members to be heard by the entire audience, broadly overlapping sound acquisition and diffusion zones can trigger a positive feedback loop.

Suppression of feedback may also be accomplished by sending the audio input signal through a digital signal processor ("DSP") prior to amplification. Some prior art audio systems that use DSPs rely on detection and suppression of feedback using after-the-fact gain control. This is often undesirable because there can still be a loud squeal between the time the runaway feedback begins and the time when the audio system detects and corrects for the runaway feedback.

Other prior art audio systems that use DSPs, for example in teleconferencing systems, might incorporate technologies such as echo cancellation and echo suppression, however, that is a slightly different problem and is somewhat simpler to deal with since there are two audio systems in the loop and the sound spaces are distinct. The problem is more difficult when the input sound space and the output sound space are not segregated and separated by any sound processing mechanisms but are free to have their sounds intermixed.

SUMMARY

In one aspect, the components and techniques described herein provide for avoidance of audio feedback and, in particular, provide audio signal processing systems that reduce the requirement for physical segregation of sound acquisition and diffusion zones. Audio input signals are filtered and modified to eliminate overlap in frequencies between desired audio input signals and produced audio output signals so as to preserve the quality of the desired audio input signals while optimizing gain before feedback.

In one aspect, the components and techniques described herein feature a digital signal processor ("DSP") for avoiding audio feedback. The DSP includes an audio input receiver. A filter bank is provided that includes interleaved band-pass filters and band-stop filters. A frequency modifier is provided that modifies each passband of the filtered audio input signal to fall within a bandwidth of a band-stop filter in the filter bank.

In some implementations of the DSP, the filter bank may be a comb filter. In some implementations of the filter bank, there are five band-pass filters and five band-stop filters per octave. In some implementations of the filter bank, the peak of a band-pass filter varies from a notch of an adjacent band-stop filter by 10 to 20 dB. In some implementations of the filter bank, the stopband depth is dynamically minimized to optimize gain before feedback.

In some implementations of the DSP, the frequency modifier shifts each passband of the filtered audio input signal by a quantity approximately equivalent to the span of an adjacent stopband. In some implementations of the frequency modifier, the frequency spectrum of the first filter bank is dynamically selected in accordance with the frequency spectrum of the desired output.

In some implementations of the DSP, a power spectrum generator is included along with a spectral density analyzer that detects whether the primary acoustic energy of the audio input signal coincides with a stopband. A filter inverter is provided to invert the passbands and stopbands if the primary acoustic energy of the audio input signal coincides with a stopband.

Some implementations of the DSP include a second filter bank that is complementary to the first filter bank. The second filter bank filters the audio input signal in parallel with the first filter bank, so that there are two output signals—one for each of the two filter banks. In such implementations, a power spectrum is generated for each output signal, and then the spectrum density analyzer selects the output signal with a higher power level for further processing.

In one aspect, the components and techniques described herein provide a method of avoiding audio feedback, including: receiving an audio input signal; filtering the audio input signal through a series of interleaved band-pass filters and band-stop filters; and modifying the frequencies of the filtered audio input signal such that gain before feedback is increased.

In a more general aspect, the components and techniques described herein provide a for a sound space and sound processing equipment such that sound travelling electronically in a loop through the sound processing equipment that is output into a physical sound diffusion zone, received at the input to the sound processing equipment, and then re-amplified, etc. is attenuated over that loop by frequency modification. The frequency modification is such that, at least for some signals, on each pass through the loop, the sound processing equipment will attenuate or amplify individual sub-bands of the frequency spectrum of the audio signal that is received at the input of the sound processing equipment. The frequency range of each individual sub-band is modified as it passes through the sound processing equipment, transformed into sound in the physical space, picked up again by the sound processing equipment, and then passes through again, so that the sub-band is attenuated on at least one of those passes through the sound processing equipment. The attenuation can be performed by configuring the sound processing equipment to amplify some input frequencies and shift those frequencies to other frequencies that the sound processing equipment is configured to attenuate.

These general and specific aspects may be implemented using a component, a system, a method, or a computer program, or any combination of components, systems, methods, and computer programs.

Also attached hereto are appendices A and B, providing computer code listings. The computer code represented there can be stored in a processor-readable memory coupled to a processor such that the processor can read from the memory and perform actions corresponding to the computer code. The computer code is in a particular computer language, but it is known to those of ordinary skill in the art how to convert from one language to another and how to implement a processing system so that it performs functions described by disclosed computer code. Therefore, the present disclosure need not delve in great detail as to how an apparatus can be made to operate according to computer code when the computer code is shown. It should be understood that such apparatus is disclosed herein or can be inferred from the teachings herein. The computer code is in a Matlab™ form and can comprise instructions for a processor, hardware, DSP and/or software running on a general purpose computer.

DETAILED DESCRIPTION OF EXEMPLARY EMBODIMENTS

Under free-field wave conditions, acoustical separation between a sound acquisition zone and a sound diffusion zone is a typical strategy for avoiding feedback, but it may not be possible in all situations, such as when the performer needs to be able to move through the audience area and mingle with the crowd while still speaking into the microphone. This may occur in many situations, e.g., a talk-show host goes into the audience to interact with guests, a singer at a concert venue moves into the crowd while performing, or cast members in a dramatic performance are placed at different locations within the audience area. Under such conditions, it is important not only to take measures to avoid feedback, but also to preserve the quality of the desired input.

Figure 1A:
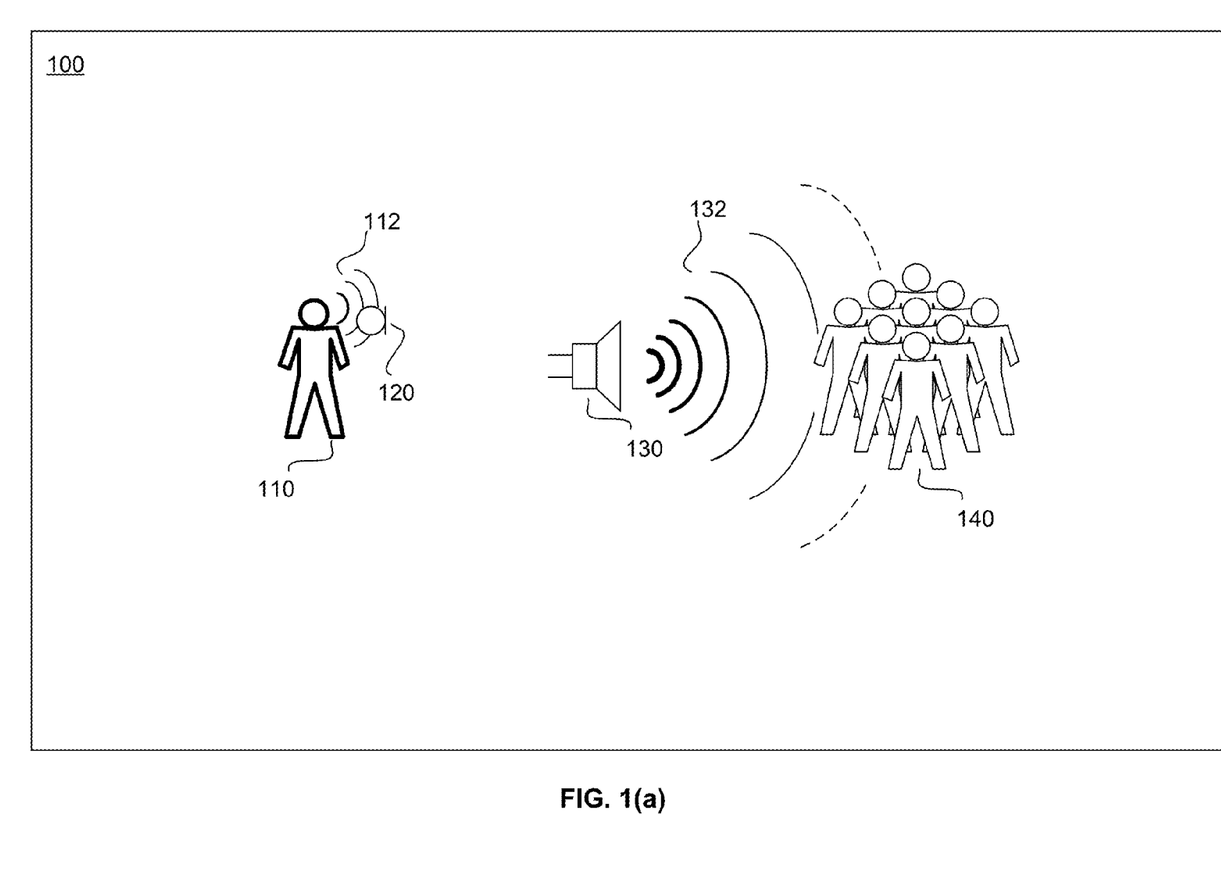
FIG. 1(a) is a block diagram illustrating a free-field wave scenario with acoustical separation between a sound acquisition zone and a sound diffusion zone.

FIG. 1(a) illustrates a configuration with acoustical separation between sound acquisition and diffusion zones. Physical space 100 may be, by way of example, a room, an auditorium, a theater, or an outdoor concert venue. Performer 110 is shown speaking into microphone 120—this creates sound acquisition zone 112, where the desired audio input can be captured. Other sound-to-electrical signal converters might be used instead of a microphone. Directional speaker 130 outputs the amplified sound of the voice of performer 110 in the direction of audience 140—this creates sound diffusion zone 132. In FIG. 1(a), directional speaker 130 is pointed away from microphone 120, so the acoustic loss from speaker 130 to microphone 120 is high, thereby reducing the likelihood that gain in this loop will exceed unity.

Figure 1B:
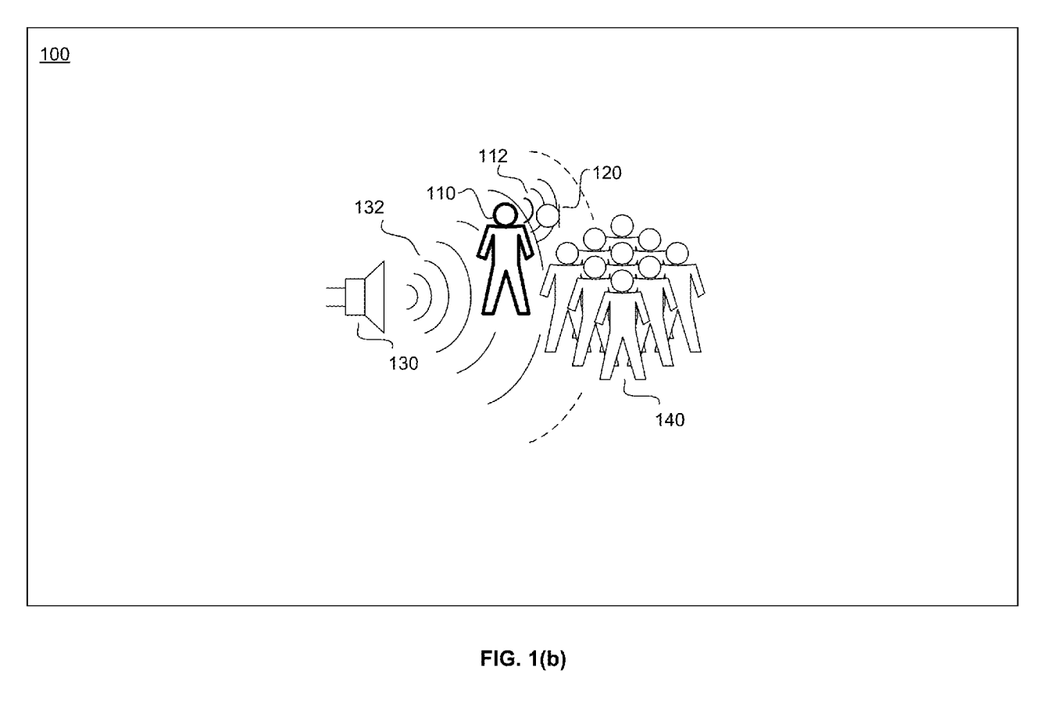
FIG. 1(b) is a block diagram illustrating a free-field wave scenario with acoustical region coupling.

FIG. 1(b) illustrates a configuration with acoustical region coupling. In contrast to FIG. 1(a), performer 110 is speaking into microphone 120 at a point between speaker 130 and audience 140—this results in overlap between sound acquisition zone 112 and sound diffusion zone 132. Due to acoustical region coupling, microphone 120 picks up not only the desired audio input from performer 110 but also the amplified sound from speaker 130; the loop gain will likely exceed unity, and a positive feedback loop will be created.

Digital Signal Processor

In order to avoid feedback in a setup involving acoustical region coupling, a preferred embodiment provides a DSP for insertion into the loop. The DSP pre-processes the audio input signal to filter out any or most feedback and modify the frequencies of the desired audio input signal to eliminate or reduce the possibility of overlap with feedback.

Figure 2:
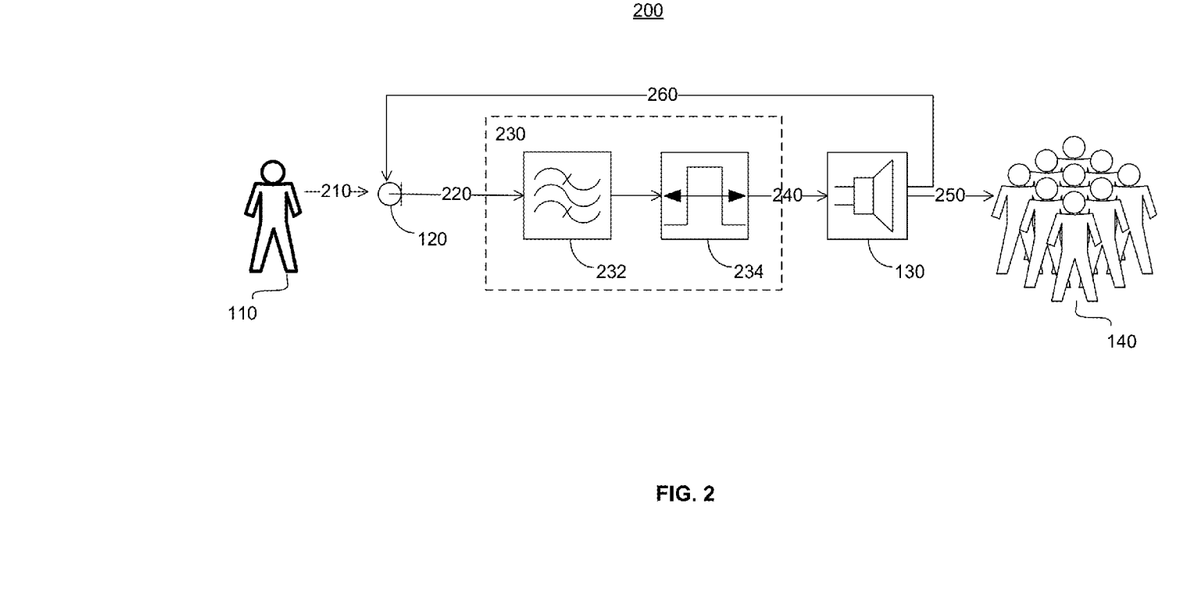
FIG. 2 is a block diagram illustrating one embodiment of the DSP.

FIG. 2 illustrates an embodiment of a sound processing system that helps to avoid the positive feedback created in the scenario illustrated in FIG. 1(b). In FIG. 2, the desired audio input 210 is captured by microphone 120, which also captures feedback 260. Microphone 120 then sends combined audio input signal 220 to DSP 230. DSP 230 may include an audio input receiver that receives combined audio input signal 220. DSP 230 may also include filter bank 232 and frequency modifier 234. The overall frequency spectrum of filter bank 232 corresponds to the overall frequency spectrum of desired audio input 210. The band-pass filters of filter bank 232 capture frequencies corresponding to desired audio input 210, and the band-stop filters of filter bank 232 eliminate frequencies corresponding to feedback 260. Frequency modifier 234 modifies the frequencies of the filtered audio input signal to correspond with stopbands of the frequency spectrum covered by filter bank 232. The filtered and modified audio input signal is then amplified and output to directional speaker 130. The sound waves output by speaker 130 generate both desired amplified output 250 and feedback 260. Positive feedback is minimized, even for configurations with acoustical region coupling, so performer 110 can now venture out into the audience 140, regardless of whether audience 140 is located in a sound diffusion zone.

Filter Bank

Figure 3A:
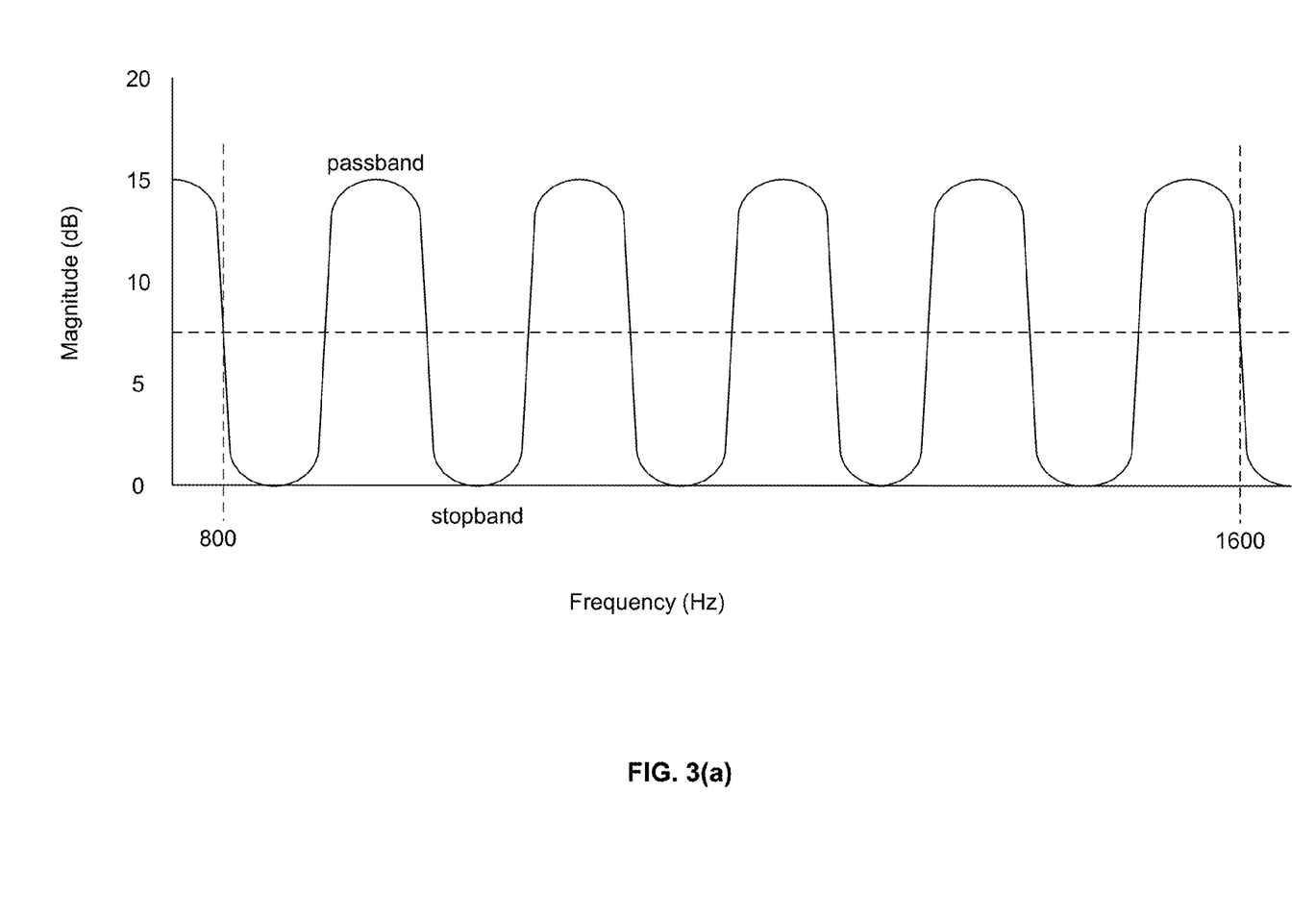
FIG. 3(a) is a block diagram illustrating one embodiment of a filter bank.

FIG. 3(a) is a block diagram illustrating one embodiment of filter bank 232. The filter bank may be implemented using filters that sharply attenuate numerous narrow sub-bands of the overall frequency spectrum of the desired audio input. A conventional filter bank may be used—one embodiment utilizes 4096-point FFT-based FIR filters. In a preferred embodiment, the filter bank comprises interleaved band-pass filters and band-stop filters, wherein the granularity of the filter bank is substantially finer than a critical bandwidth.

In one embodiment, the span of a band-pass filter is equivalent to the span of an adjacent band-stop filter. Equivalency of the span of a band-pass filter as compared to the span of a band-stop filter may be assessed differently, depending upon whether a linear or logarithmic frequency scale is used (e.g., on a linear frequency scale, a band-pass filter covering a bandwidth of 50 Hz may be equivalent in span to a band-stop filter covering a bandwidth of 50 Hz, whereas on a logarithmic frequency scale, a band-pass filter covering a bandwidth of 500 Hz may be equivalent in span to a band-stop filter covering a bandwidth of 1000 Hz, because both filters span one octave). In some embodiments, the filter bank may be based upon a linear frequency scale in the low ranges and a logarithmic frequency scale in the high ranges, or vice versa. In some embodiments, the filter bank may be based on other combinations of linear and logarithmic frequency scales as appropriate.

Figure 3B:
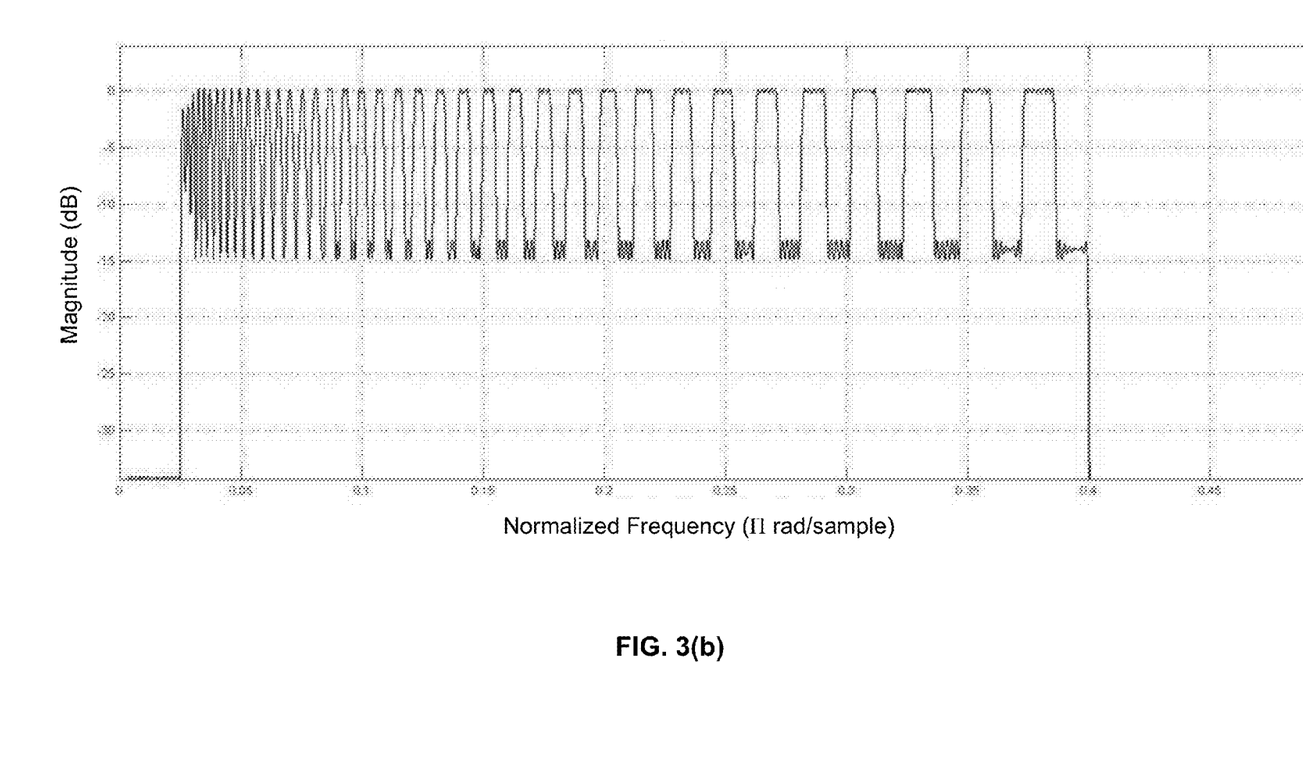
FIG. 3(b) is a plot of a Matlab simulation of one embodiment of a filter bank.

FIG. 3(b) is a plot of a Matlab™ simulation of one embodiment of a filter bank. The Matlab computer code in Appendix A comprises corresponding instructions for a processor, hardware, DSP and/or software running on a general purpose computer to compute a FIR filter that implements a set of logarithmically-ordered passbands. The passbands and the stopbands are interleaved and are equivalent in span.

In a preferred embodiment, there are a sufficient number of passbands and stopbands per octave to preserve the quality of the desired audio input at an acceptable level. One embodiment of the filter bank includes five band-pass filters and five band-stop filters per octave. If the desired audio input is the human voice, an embodiment of the filter bank could include twenty band-pass filters interleaved with twenty band-stop filters, presuming a frequency spectrum of 200 Hz to 3200 Hz.

In a preferred embodiment of the filter bank, the variance in magnitude between the peaks of the passbands and the notches of the stopbands is optimized to balance the goal of eliminating feedback with the goal of preserving the quality of the desired audio input. In an exemplary embodiment illustrated in FIG. 3, wherein the overall passband spectrum is 800 Hz to 1800 Hz, the magnitude is set at 15 dB. A preferred embodiment of the filter bank may limit this variance in magnitude to 10 to 20 dB; this range is ideally adjusted to the optimal range for the given conditions. In one embodiment, the stopband depth of the filter bank is dynamically minimized to optimize gain before feedback.

In one embodiment of the filter bank, it is possible to adjust the frequency spectrum of the filter bank to accommodate the range of the desired audio input. In one embodiment of the filter bank, the frequency range of the desired audio input is detected, and the frequency spectrum of the filter bank is dynamically adjusted to accommodate that range.

In one embodiment of the DSP, prior to filtering the audio input signal, a power spectrum is generated, and then a spectral density analyzer detects whether the primary acoustic energy of the audio input signal coincides with one or more stopbands of the filter bank. If such a conflict is detected, the filter bank is dynamically inverted so as to swap the passbands and stopbands. The spectral density analyzer may rectify, filter, and measure the instantaneous or longer-term signal level in each band (stopband and passband) of the filter bank, and then determine where the preponderance of signal energy resides. One embodiment includes a power spectrum generator to generate a power spectrum, a processor to determine the frequencies at which the primary acoustic energy is generated, and a spectral density analyzer to compare those frequencies to the stopbands of the filter bank.

In another embodiment of the DSP, two filter banks run in parallel, wherein a second filter bank has passbands and stopbands that are complementary to the first filter bank. A power spectrum is generated for the output signal of each of the two filter banks, and then the spectral density analyzer then detects which output signal has a higher power level and selects the output signal with the higher power level for further processing by the frequency modifier. The spectral density analyzer may rectify, filter, and then compare the instantaneous or longer-term signal energy in each band for each of the two filter banks Frequency Modifier The frequency modifier sharply attenuates passbands of the filtered audio input signal by modifying them to correspond with the stopbands of the frequency spectrum covered by the filter bank. In one embodiment, where the span of all band-pass filters and band-stop filters in the filter bank are equivalent, the frequency modifier may scale the frequency range of each passband in the filtered audio input signal by the span of 2N+1 bands, where N is a constant, and N≧0. N is ideally less than the upper limit beyond which the quality of the desired audio input is noticeably degraded; for example, in the case where the desired audio input includes a human voice, if the frequency range of the filtered audio input signal were shifted by a third of an octave or more, the pitch would be noticeably higher. In one embodiment, the frequency modifier modifies the frequency range of the filtered audio input signal such that the level of attenuation is sufficiently high to meet a quality threshold, which may vary in accordance with the desired audio output.

Figure 4A:
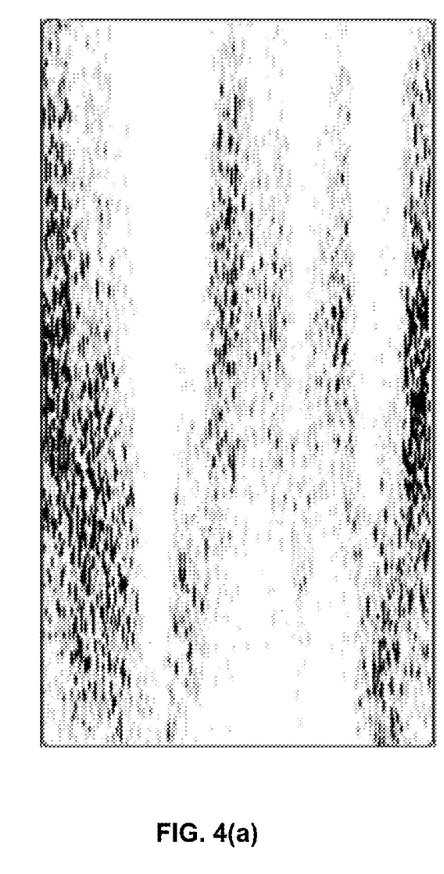
FIGS. 4(a)-(c) are sonograms that illustrate how the audio signals are processed in one embodiment.
Figure 4B:
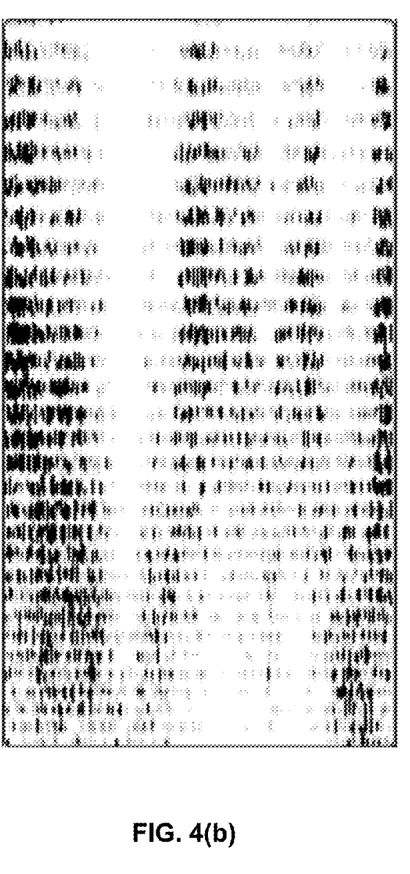
Figure 4C:
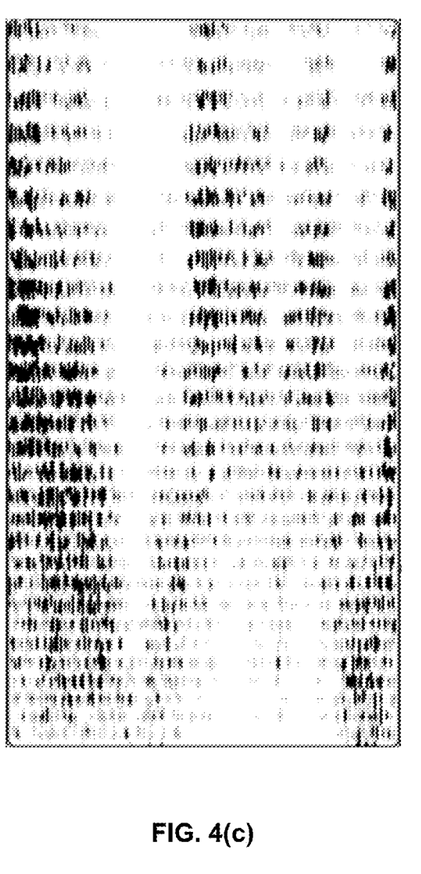

FIGS. 4(a)-(c) are sonograms illustrating how the exemplary embodiment in FIG. 2 processes the audio input signal. FIG. 4(a) is a sonogram of combined audio input signal 220. FIG. 4(b) is a sonogram of the audio input signal after it has passed through the filter bank. Numerous narrow sub-bands of the audio input signal have been sharply attenuated. FIG. 4(c) is a sonogram of the audio input signal after it has been processed by the frequency modifier. The frequency ranges of the filtered audio input signal have been shifted so that passbands of the filtered audio input signal will now be attenuated by the band-stop filters in the filter bank if the processed audio output remains in the loop as feedback 260.

The frequency modifier may be based on a conventional algorithm (e.g., Time Domain-Pitch Synchronous Overlap Add (TD-PSOLA), Short-time Fourier Transform (STFT), or Modulated Complex Lapped Transform (MCLT)). The Matlab computer code listed in Appendix B comprises corresponding instructions for a processor, hardware, DSP and/or software running on a general purpose computer to compute a frequency modifier for a logarithmic frequency scale—the frequency shifting is based on MCLT, which may be easier to implement in some embodiments designed for a data-streaming (live sound data) setting. The computer program code in Appendix B, showing implementations of the fmclt( ) and fimclt( ) functions, are from Malvar, Henrique S., "Fast Algorithm for the Modulated Complex Lapped Transform," published January 2005 and available at http://research.microsoft.com/pubs/70128/tr-2005-02.pdf.

Figure 5A:
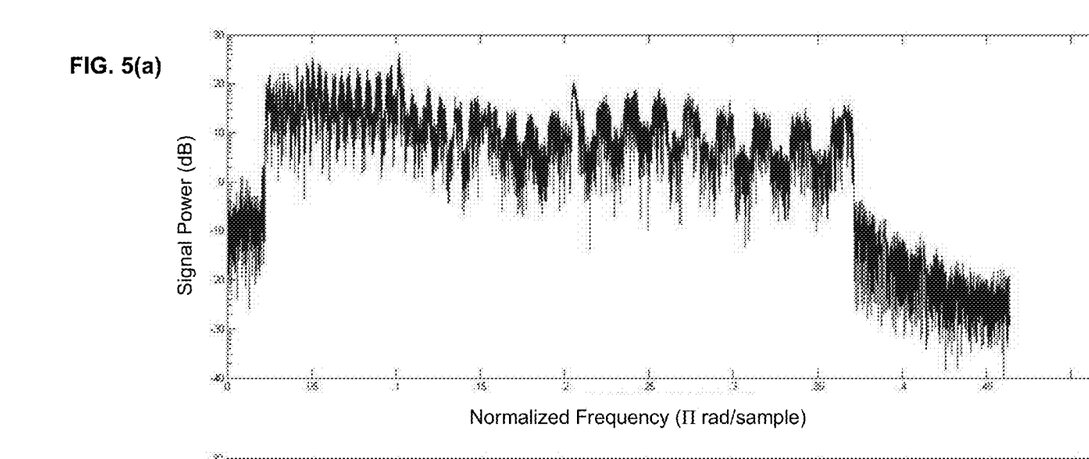
FIGS. 5(a)-(b) are plots of Matlab simulations of one embodiment of a frequency modifier.
Figure 5B:
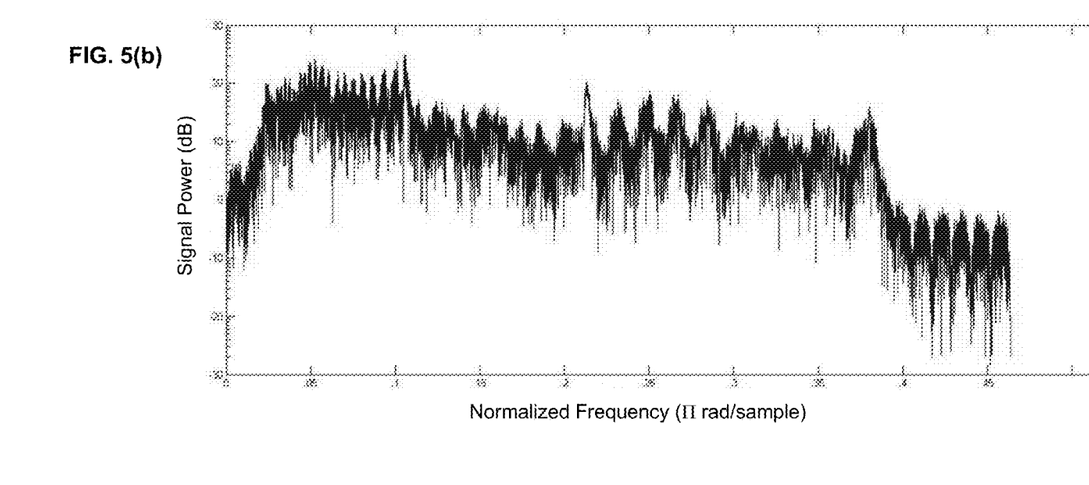

FIGS. 5(a)-(b) are plots of Matlab simulations (according to the Matlab computer code provided herein) of one embodiment of a frequency modifier. FIG. 5(a) is a Matlab plot of an audio input signal after it has passed through a filter bank. FIG. 5(b) is a Matlab plot of the filtered audio input signal of FIG. 5(a) after it has passed through the frequency modifier.

Figure 6:
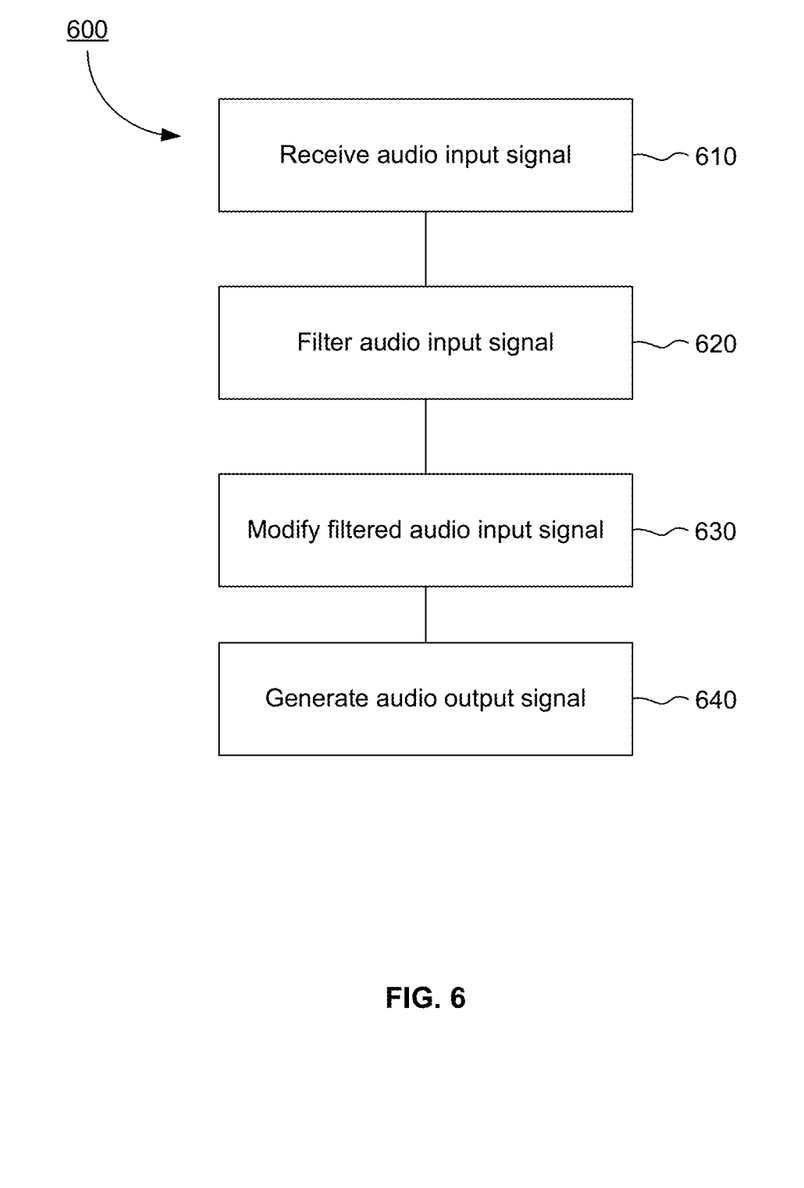
FIG. 6 is a flowchart describing one embodiment of a method implementing the techniques described herein.

FIG. 6 is a flowchart illustrating an exemplary embodiment of a method 600 implementing some of the techniques described herein. At step 610, the audio input signal is received by the audio input receiver. The audio input receiver may include any conventional component for receiving an audio input signal. Digital signals may be received using conventional components for receiving electrical signals, and sound waves may be received using conventional components for receiving sound waves and then converted to an electrical signal using any conventional converter. At step 620, the audio input signal is filtered using a filter bank or any other conventional technique for filtering an audio input signal to sharply attenuate numerous narrow sub-bands of the audio input signal. At step 630, the audio input signal is modified so that passbands of the filtered audio input signal will now be attenuated if the processed audio output remains in the loop as feedback. At step 640, the audio output signal is generated—from this point, the audio output signal may be amplified and output to speakers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, in some embodiments, it may be sufficient to modify only one passband of the filtered audio input signal. Therefore, the scope of the appended claims should be accorded the broadest interpretation so as to encompass all such modifications and similar arrangements.

APPENDIX A

```
function [filter] = LogFircls(minf, maxf, sampleRate, nCoeffs, nbands,
mlo, tol, compl)
% computes a FIR filter that implements a set of logarithmically
% ordered passbands. The passbands and the stop bands are interleaved
% and the same width in log space (same ratio).
%
%   minf = min frequency (Hz), e.g. 300
%   maxf = max frequency (Hz), e.g. 3200
%   sampleRate = samples per second, e.g. 16000
%   nCoeffs = size of FIR filter, e.g. 1024
%   nbands = # of passbands, e.g. 50
%   mlo = stopband pass level, e.g. 0.10
%   tol = tolerance for fircls( ) (least squares filter design), e.g. 0.15
%   compl = true returns odd bands, false returns even bands.
%
%   filter is the FIR coefficients from fircls( ).
nyq      = sampleRate/2;
flo      = minf/nyq;
fhi      = maxf/nyq;
ontol    = tol;
offtol   - tol;
nsteps = nbands*2;        % nbands on, nbands off
f      = zeros(1,nsteps+2);
a      = zeros(1,nsteps+1);
up     = zeros(1,nsteps+1);
lo     = zeros(1,nsteps+1);
f(2:end-1) = logspace(log10(flo),log10(fhi),nsteps);
f(end)   = 1;
a(1)     = 0;              % zero at 0 Hz
up(1)    = ontol;
lo(1)    = -ontol;
if compl>0
    for i=2:2:nsteps
        a(i)       = 1.;
        up(i)      = 1.+ontol;
        lo(i)      = 1.-ontol;
        a(i+1)     = mlo;
        up(i+1)    = mlo+offtol;
        lo(i+1)    = mlo-offtol;
    end
else
    for i=2:2:nsteps
        a(i)       = mlo;
        up(i)      = mlo+offtol;
        lo(i)      = mlo-offtol;
        a(i+1)     = 1.;
        up(i+1)    = 1.+ontol;
        lo(i+1)    = 1.-ontol;
    end
end
a(end) = 0.;             % zero at nyquist
up(end) = 0.+offtol;
lo(end) = 0.-offtol;
filter = fircls(nCoeffs,f,a,up,lo,'trace');
```

APPENDIX B

```
%%%%%%%%%
function out = pitchFilterMCLT(signal, sampleRate, flo, fhi, nbands)
x = signal;
x = x(:);
sent_L = length(x);
nsteps = nbands*2;
bands    = logspace(log10(flo),log10(fhi),nsteps);
ratio    = bands(4)/bands(3);
bands    = int32(round(bands));
f0 = .1*ones(sampleRate,1);
for i=1:2:nsteps
    f0(bands(i):bands(i+1)) = 1;
end
scale = ratio;
L        = 400; %frame length
S        = L/4; %hop size
overlap  = L - S;
Nframe   = floor((sent_L-overlap)/S);
Lq       = L*scale;
Lq       = round(Lq);
a        = 0.50;
b        = -0.50;
n        = 1:L;
win      = sqrt(S)/sqrt((4*a^2+2*b^2)*L)*(a+b*cos(2*pi*n/L));
win      = win(:);
n        = 1:Lq;
winq     = sqrt(S)/sqrt((4*a^2+2*b^2)*Lq)*(a+b*cos(2*pi*n/Lq));
winq     = winq(:);
Nit      = 4;
xfinal   = zeros(sent_L,1);
U = sum(win)/(S);
k = 1;
for n = 1:Nframe
    if    (k:k+Lq-1)<=sent_L
        frm = winq.*x(k:k+Lq-1)/U;
    else
        frm = winq.*[x(k:sent_L);zeros(Lq - (sent_L-k+1),1)]/U;
    end
    frm_resamp = resample(frm, L, round(Lq));
    xSTFTM = abs(fmclt(frm_resamp));
    if k+L-1<=sent_L
        res = xfinal(k:k+L-1);
    else
        res = [xfinal(k:sent_L);zeros(L - (sent L-k+1),l)];
    end
    x_recon = iterated_recon(xSTFTM, res, Nit, win);
    if    (k+L-1<=sent_L)
        xfinal(k:k+L-1) = xfinal(k:k+L-1) + x_recon;
    else
        xfinal(k:sent_L) = xfinal(k:sent_L) + x_recon(1:sent_L-k+1);
    end
    k = k + S;
end
out = xfinal;
%%%%%%%%%
function x_recon = iterated_recon(xSTFTM, x_res, Nit, win)
j = sqrt(-1);
for i = 1:Nit
    phi = angle(fmclt(win.*x_res)) + randn(length(x_res)/2,1)*0.01*pi;
    % random phase perturbation to reduce resonance.
    x = xSTFTM.*exp(j*phi); %M-constraint
    x_recon = fimclt(x);
    x_res = real(x_recon);
end
x_recon = x_res;
%%%%%%%%%
function X = fmclt(x)
%     fast Modulated Complex Lapped Transform
%     (basically, cosine windowed FFT)
%     x is real, X is half-length complex, X[1] is DC
L = length(x);
M = L/2;
U = sqrt(1/(2*M)) * fft(x);
k = (0:M)';
c = W(8,2*k+1)   .* W(4*M,k);
V = c .* U(1:M+1);
X = 1i * V(1:M) + V(2:M+1);
return;
%%%%%%%%%
function y = fimclt(X)
```

APPENDIX B-continued

```
%       fast Inverse Modulated Complex Lapped Transform
%       (basically inverse cosine windowed fft)
%       X is single-sided complex, y is double length real, X[1] is DC.
M = length(X);
Y = zeros(2*M,1);
k = (1:M–1)';
c = W(8,2*k+1) .* W(4*M,k);
Y(2:M)          = (1/4) * conj (c) .* (X(1:M–1) – 1i * X(2:M));
Y(1)            = sqrt(1/8) * (real(X(1)) + imag(X(1)));
Y(M+1)          = –sqrt(1/8) * (real(X(M)) + imag(X(M)));
Y(M+2:2*M)      = conj(Y(M:–1:2));
y = real(ifft(sqrt(2*M) * Y));
return;
%%%%%%%%
function          w = W(M,r)
w = exp(–1i*2*pi*r/M);
return;
```

What is claimed is:

1. A digital signal processor for avoiding audio feedback, the digital signal processor comprising:
   an audio input receiver;
   a first filter bank, wherein the first filter bank comprises interleaved band-pass filters and band-stop filters;
   a power spectrum generator to generate a power spectrum of an audio input signal, the audio input signal including a primary acoustic energy;
   a spectral density analyzer that detects whether the primary acoustic energy of the audio input signal coincides with a band-stop filter in the first filter bank; and
   a filter inverter, wherein:
      if the spectral density analyzer determines that the primary acoustic energy of the audio input signal coincides with the band-stop filter in the first filter bank, the filter inverter inverts the first filter bank, and
      if the spectral density analyzer determines that the primary acoustic energy of the audio input signal does not coincide with the band-stop filter in the first filter bank, the filter inverter does not invert the first filter bank; and
   a frequency modifier, wherein the frequency modifier modifies at least one passband of the filtered audio input signal output by the first filter bank to fall at least partially within a portion of a bandwidth of a band-stop filter in the first filter bank.

2. The digital signal processor of claim 1, wherein the frequency modifier modifies at least one passband of the filtered audio input signal to attain a level of attenuation that is sufficiently high to meet a quality threshold.

3. The digital signal processor of claim 1, the first filter bank comprising a comb filter.

4. The digital signal processor of claim 1, the first filter bank comprising five band-pass filters and five band-stop filters per octave.

5. The digital signal processor of claim 1, wherein a peak of a band-pass filter varies from a notch of an adjacent band-stop filter by 10 to 20 dB.

6. The digital signal processor of claim 1, wherein a stopband depth of the first filter bank is dynamically minimized to optimize gain before feedback.

7. The digital signal processor of claim 1, wherein the frequency modifier shifts each passband of the filtered audio input signal by a quantity approximately equivalent to the span of an adjacent stopband.

8. The digital signal processor of claim 1, wherein a frequency spectrum of the first filter bank is dynamically selected in accordance with a frequency spectrum of a desired output.

9. The digital signal processor of claim 1, further comprising:
   a second filter bank, wherein the second filter bank is complementary to the first filter bank, and wherein the second filter bank filters the audio input signal in parallel with the first filter bank; and
   a power spectrum generator;
   a spectral density analyzer that selects between a first output signal of the first filter bank and a second output signal of the second filter bank in accordance with which output signal has a higher energy level.

10. A method of avoiding audio feedback, the method comprising:
   receiving an audio input signal by an audio input receiver;
   generating, by a power spectrum generator, a power spectrum of an audio input signal, the audio input signal including a primary acoustic energy;
   determining, by a spectral density analyzer, that the primary acoustic energy of the audio input signal coincides with a band-stop filter of a first filter bank;
   if the spectral density analyzer determines that the primary acoustic energy of the audio input signal coincides with the band-stop filter in the first filter bank, inverting, by a filter inverter, the first filter bank;
   if the spectral density analyzer determines that the primary acoustic energy of the audio input signal does not coincide with the band-stop filter in the first filter bank, the filter bank is not inverted;
   filtering the audio input signal through the first filter bank, wherein the first filter bank comprises interleaved band-pass filters and band-stop filters; and
   modifying, by a frequency modifier, at least one passband of the filtered audio input signal output by the first filter bank to fall at least partially within a portion of a bandwidth of a band-stop filter in the first filter bank.

11. The method of claim 10, wherein modifying frequency ranges of the filtered audio input signal attains a level of attenuation that is sufficiently high to meet a quality threshold.

12. The method of claim 10, wherein filtering the audio input signal comprises filtering the audio input signal through a comb filter.

13. The method of claim 10, further comprising dynamically minimizing a stopband depth of the first filter bank to optimize gain before feedback.

14. The method of claim 10, wherein modifying frequency ranges of the filtered audio input signal comprises shifting each passband of the filtered audio input signal by a quantity approximately equivalent to the span of an adjacent stopband.

15. The method of claim 10, further comprising dynamically selecting a frequency spectrum of the first filter bank in accordance with a frequency spectrum of a desired output.

16. The method of claim 10, further comprising:
   filtering the audio input signal in parallel through a second filter bank, wherein the second filter bank is complementary to the first filter bank, and wherein the second filter bank filters the audio input signal in parallel with the first filter bank; and
   selecting between a first output signal of the first filter bank and a second output signal of the second filter bank in accordance with which output signal has a higher signal energy.

* * * * *